United States Patent [19]

Parrill

[11] Patent Number: 4,930,797
[45] Date of Patent: Jun. 5, 1990

[54] SAFETY STEP SYSTEM

[76] Inventor: Lee R. Parrill, 465 Jefferson St., Lander, Wyo. 82520

[21] Appl. No.: 368,779

[22] Filed: Jun. 20, 1989

[51] Int. Cl.⁵ .............................................. B60R 3/02
[52] U.S. Cl. ...................................... 280/166; 182/91
[58] Field of Search .................. 280/163, 166, 164; 182/91, 95, 96, 90

[56] References Cited

U.S. PATENT DOCUMENTS

| | | | |
|---|---|---|---|
| 3,627,350 | 12/1971 | Cross | 280/166 |
| 3,799,288 | 3/1974 | Manuel | 182/91 |
| 4,106,790 | 8/1978 | Weiler | 280/166 |
| 4,191,388 | 3/1980 | Barksdale | 280/166 |
| 4,194,754 | 3/1980 | Hightower | 280/166 |
| 4,198,070 | 4/1980 | Weiler | 280/166 |
| 4,273,217 | 6/1981 | Kajita | 280/166 |
| 4,556,125 | 12/1985 | Johnson | 280/166 |

Primary Examiner—Charles A. Marmor
Assistant Examiner—Richard Camby
Attorney, Agent, or Firm—Dean P. Edmundson

[57] ABSTRACT

A fold-out saftey step system for use in a passenger van having a side door. A planar step is attached to two leg members which in turn are pivotally attached to the floor of the van. The step can be folded out and down when the side door is open. When the step is folded up and inwardly the side door can be closed. The step includes a metal grate through which mud, snow, and dirt will pass to prevent built-up on the step.

6 Claims, 3 Drawing Sheets

SAFETY STEP SYSTEM

FIELD OF THE INVENTION

This invention relates to step systems for vehicles. More particularly, this invention relates to safety steps for vehicles. Even more particularly, this invention relates to fold-out step systems for vehicles.

BACKGROUND OF THE INVENTION

Passenger vans have become very popular for transporting passengers in commercial travel. For example, they are widely used for transporting persons between hotels and airports, around cities, and to and from work sites and offices, etc. Typically such vans have one or more side doors to allow loading and unloading of passengers.

Although vans typically have a recessed tread area or step for passengers to use in entering and leaving the van, such step is fairly high off the ground. Elderly people especially have difficulty in entering and exiting a van because of the height of the step area.

A separate stool or platform can be carried along in the van and then placed on the ground outside the side door of the van to assist people in stepping into or out of the van, but this is inconvenient. The stool or platform may become lost or stolen. Also, a separate storage area is required to place the item so that it can be readily accessed when needed. Further, the stool or platform is normally fairly small and does not present a very large stepping area for passengers. It is also necessary to support the stool or platform on stable ground or a stable surface to prevent it from tilting or collapsing when a passenger stands on it.

Although folding steps have been used in various applications, none of them has been suitable for use at the side door area of a passenger van. For example, U.S. Pat. No. 4,191,388 describes a tailgate step for use on a truck tailgate. U.S. Pat. No. 4,194,754 describes a folding step for use on a bumper of a truck. U.S. Pat. No. 4,198,070 describes a step for use on step bumpers for trucks. U.S. Pat. No. 3,799,288 also describes a stair assembly for use on a truck bumper. U.S. Pat. No. 4,273,217 describes a wheelchair lift for a bus.

U.S. Pat. No. 4,556,125 describes a method for installing a pivotal ladder to a vehicle. Such ladder does not overcome the disadvantages of the prior devices. U.S. Pat. No. 3,627,350 describes a retractable step for an automobile vehicle (e.g., truck, camper or trailer). The step is pivotably attached to the bumper.

There has not heretofore been described a safety step system for the side door area of a passenger van which is safe and convenient for use.

SUMMARY OF THE PRESENT INVENTION

In accordance with the present invention there is provided a fold-out safety step system for a passenger van of the type having a side door which is movable between open and closed positions. The safety step system comprises:
(a) a planar step member comprising a metal grate, and the step member includes first and second ends; and
(b) first and second leg members secured to the first and second ends of the step member.

The legs are pivotally mounted to the van in a manner such that the step member is pivotable between upward and downward positions when the side door is in its open position.

When the step member is in its downward position it is lower than the floor of the van and is in a horizontal plane. When the step member is in the upward position, and the door is in the closed position, the step member is enclosed within the van.

In one embodiment the leg members are pivotally mounted to a recessed tread area in the van. In another embodiment the leg members are pivotally mounted to a vertical wall extending between the floor and the tread area.

The safety step system of the invention is very convenient to use and greatly facilitates the entering and leaving the van by the passengers (especially elderly passengers). The safety step does not rest on the ground and therefore is much more stable than devices such as stools and platforms.

Other advantages of the safety step system of the invention will be apparent from the following detailed description and the appended drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
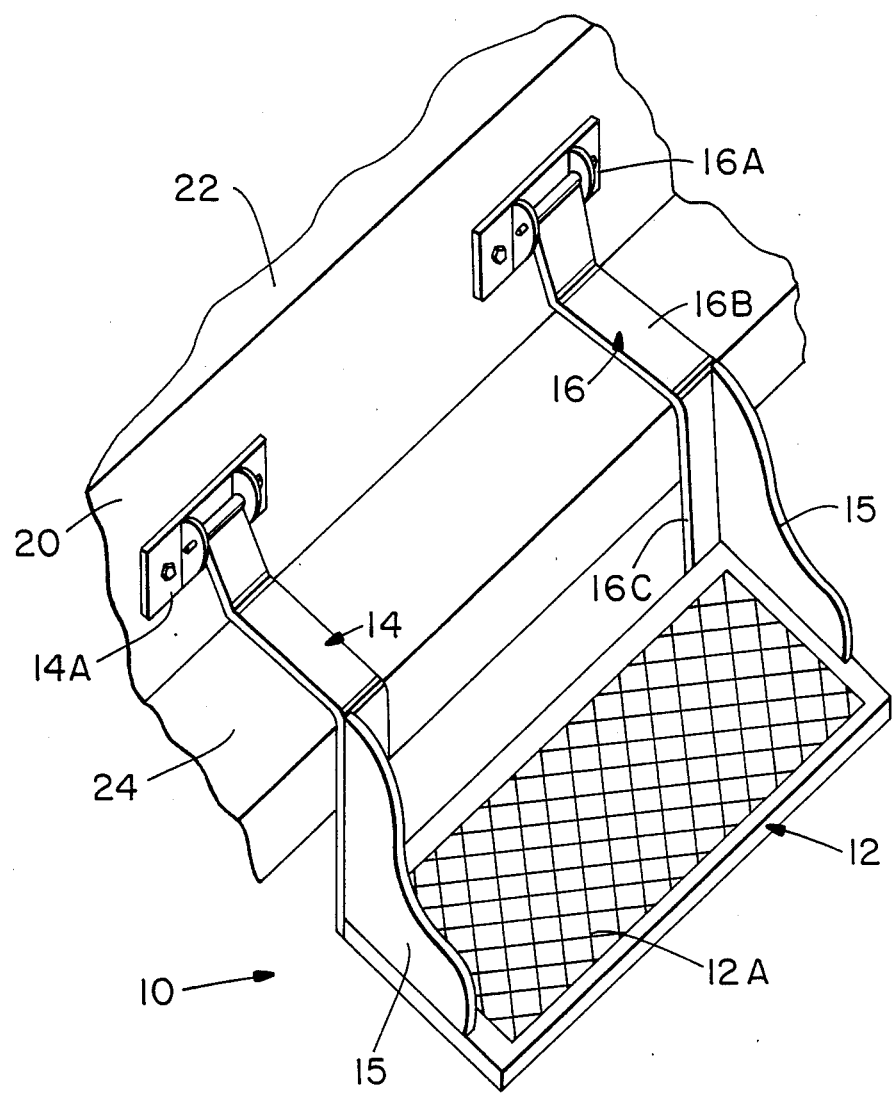
FIG. 1 is a perspective view illustrating one embodiment of safety step system of the invention.
Figure 2:
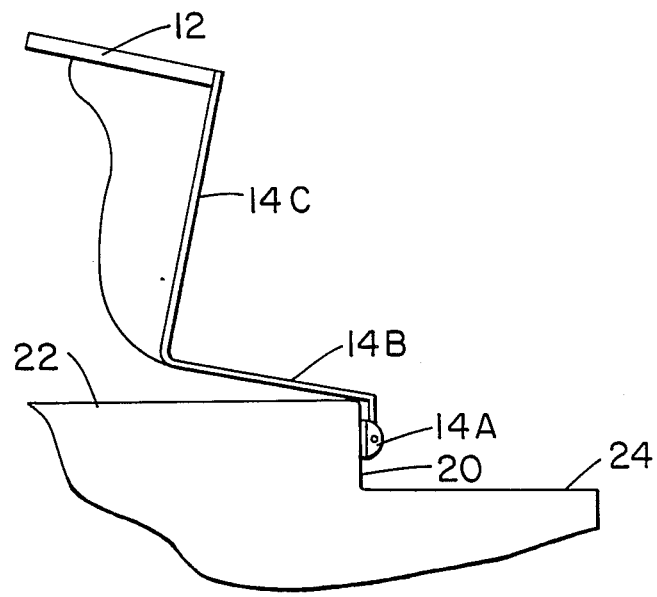
FIG. 2 is an end view showing the safety step system of FIG. 1 in its upward position.

One embodiment of safety step system 10 of the invention is illustrated in FIGS. 1 and 2. It comprises a planar step member 12, a first leg member 14, and a second leg member 16. One end of leg member 14 is pivotably attached to mounting bracket 14A, and similarly one end of leg 16 is pivotably attached to mounting bracket 16A. The brackets 14A and 16A are secured to a vertical wall 20 which extends between recessed step or tread area 24 and the floor 22 of the passenger van.

As illustrated, one leg member is secured to each end of the step. Each leg member includes a right angle bend near its mid-point to allow one portion of the leg member to rest on the tread area 24 when the step is in its lowered position. For example, leg 16 includes portions 16B and 16C which are perpendicular to each other. Also, leg 14 includes portions 14B and 14C which are perpendicular to each other.

The step 12 includes a metal grate (e.g., expanded metal) which provides a good non-skid surface for stepping and standing on. Also, mud, dirt, snow, water etc. can fall through the grate. This prevents build-up of debris which would otherwise present a slippery or unsafe condition.

At each end of the step there is an upstanding wall 15. This is very desirable for adding to the structural integrity of the step and also for preventing a foot from sliding off either end of the step during use.

The length of the step may vary. It is preferred for the step to extend nearly the entire length of the side door area of a van. The distance to which the step extends below the tread area 24 may vary. Preferably it extends several inches below the tread area when the step is in its downward position.

The step is easily pivoted between its upward and downward positions. When the step is in its upward position (shown in FIG. 2) the side door(s) of the van may be closed.

Figure 4:
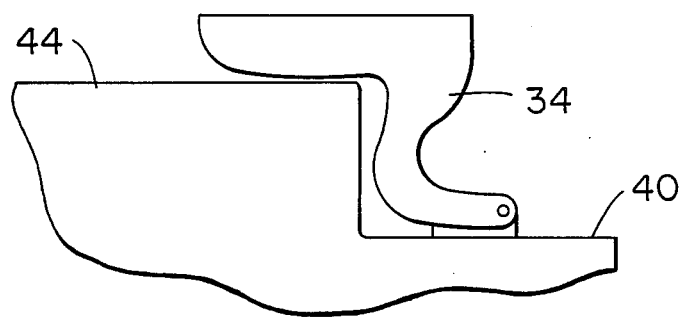
FIG. 4 is an end view showing the safety step system of FIG. 3 in its upward position.
Figure 3:
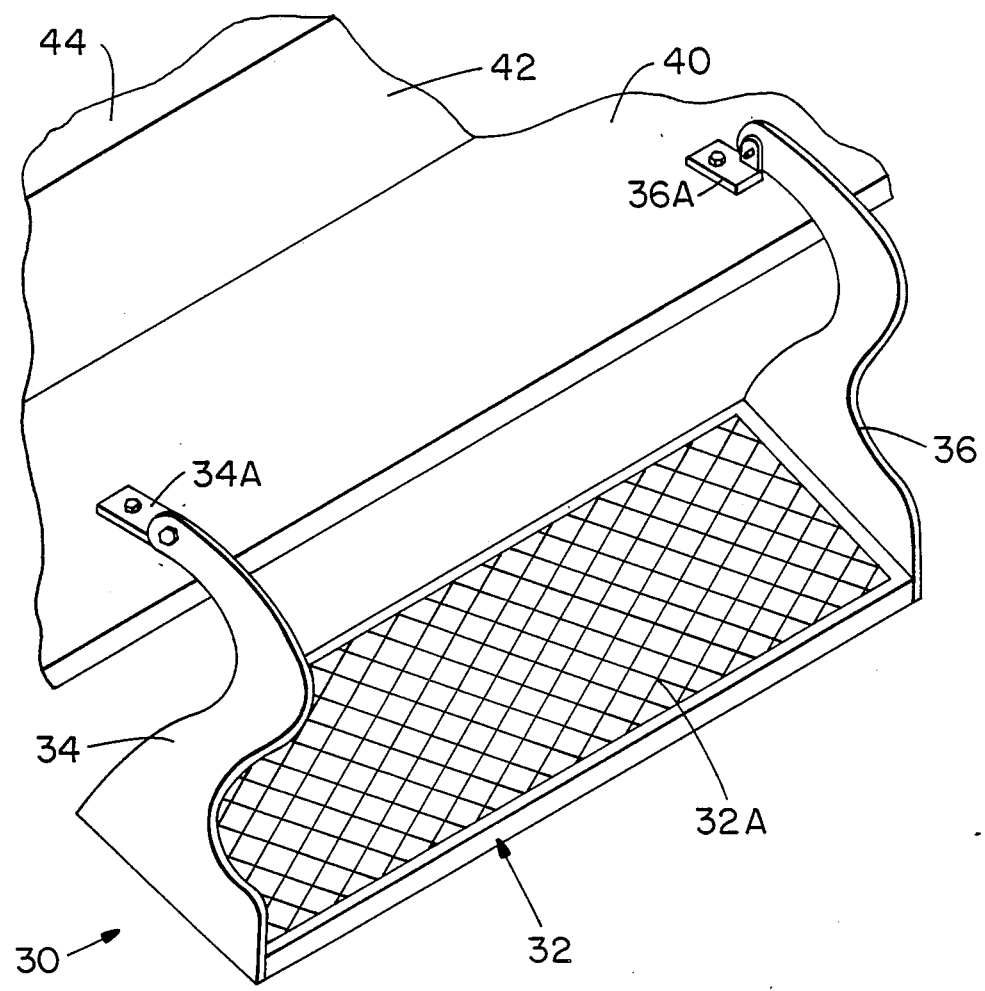
FIG. 3 is a perspective view illustrating another embodiment of safety step system of the invention.

Another embodiment of safety step system 30 is illustrated in FIGS. 3 and 4. Leg members 34 and 36 are attached to opposite ends of the step member 32. One end of leg 34 is pivotably attached to mounting bracket 34A, and one end of leg 36 is pivotably attached to mounting bracket 36A. The mounting brackets are secured to tread area 40 of the van in the side door area.

Vertical wall 42 extends between tread area 40 and the floor 44 of the van. The leg members include as an integral part thereof a vertical wall which adds to the strength of the step member and also prevents a foot from sliding off either end of the step.

The step member 32 is planar and includes a metal grate 32A (e.g., expanded metal). This enables debris (e.g., mud, dirt, snow, water, etc.) to pass through the step.

The step can be pivoted between its downward position (shown in FIG. 3) and its upward position (shown in FIG. 4). When the step is in its upward position the side door(s) of the van may be closed. When the side door is open the step may be easily pivoted to its downward position for use.

The safety step system is very useful for assisting passengers in loading and unloading. The step system is very stable and provides firm footing for passengers. Because the step is simply pivoted between upward and downward positions, it does not require a separate storage area. Nor is there a danger of losing or misplacing the step.

Other variants are possible without departing from the scope of this invention.

What is claimed is:

1. A fold-out safety step system for a passenger van having a side door and and a floor, wherein said side door is movable between open and closed positions; said system comprising:
   (a) a planar step member comprising a metal grate; said step member having first and second ends;
   (b) first and second leg members secured to said first and second ends of said step member;
wherein said van includes a tread area which is recessed from said floor adjacent said side door and wherein a vertical wall extends between said floor and said tread area; wherein said leg members are pivotably mounted to said vertical wall in a manner such that said step member is pivotable between upward and downward positions when said door is in said open position; wherein when said step member is in said downward position it is lower than said floor and is in a horizontal plane; and wherein when said step member is in said upward position and said door is in said closed position said step member is enclosed within said van.

2. A safety step system in accordance with claim 1, wherein said leg members each comprise an upper and a lower portion, wherein said upper portions are adapted to rest on said tread area when said step member is in said downward position, and wherein said lower portions are perpendicular to said upper portions.

3. A safety seat system in accordance with claim 1, wherein each said end of said step member includes an upstanding wall.

4. A fold-out safety step system for a passenger van having a side door and a floor, wherein said side door is movable between open and closed positions; wherein said van includes a tread area which is recessed from said floor adjacent said side door and wherein a vertical wall extends between said floor and said tread area; wherein said system comprises:
   (a) a planar step member comprising a metal grate; said step member having first and second ends;
   (i b) first and second leg members secured to said first and second ends of said step member;
wherein said leg members are pivotably mounted to said vertical wall in a manner such that said step member is pivotable between upward and downward positions when said door is in said open position; wherein when said step member is in said downward position it is lower than said tread area and is in a horizontal plane; and wherein when said step member is in said upward position and said door is in said closed position said step member is enclosed within said van.

5. A safety step system in accordance with claim 4, wherein wherein said upper portions are adapted to rest on said tread area when said step member is in said downward position, and wherein said lower portions are perpendicular to said upper portions.

6. A safety seat system in accordance with claim 4, wherein each said end of said step member includes an upstanding wall.

* * * * *